(12) United States Patent
Ge et al.

(10) Patent No.: US 8,417,831 B2
(45) Date of Patent: Apr. 9, 2013

(54) METHOD FOR IPV4 APPLICATION TRANSITION OVER IPV6 NETWORKS

(75) Inventors: Yi Ge, Beijing (CN); Zhiyong Liang, Beijing (CN); Yonghua Lin, Beijing (CN); Yan Qi Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/915,364

(22) PCT Filed: May 12, 2006

(86) PCT No.: PCT/EP2006/062268
§ 371 (c)(1),
(2), (4) Date: Nov. 23, 2007

(87) PCT Pub. No.: WO2006/125726
PCT Pub. Date: Nov. 30, 2006

(65) Prior Publication Data
US 2009/0157900 A1    Jun. 18, 2009

(30) Foreign Application Priority Data

May 25, 2005    (CN) .......................... 2005 1 0072984

(51) Int. Cl.
*G06F 15/16*    (2006.01)

(52) U.S. Cl. .................... 709/236; 709/230; 709/249

(58) Field of Classification Search .................... 709/236
See application file for complete search history.

(56) References Cited

U.S. PATENT DOCUMENTS 5,790,541 A * 8/1998 Patrick et al. ................. 370/392
(Continued)

FOREIGN PATENT DOCUMENTS

| JP | 6335270 A | 12/1994 |
|---|---|---|
| JP | 11252172 A | 9/1999 |
| JP | 2004104838 A | 4/2004 |

OTHER PUBLICATIONS

Bound et al, Dual Stack Transition Mechanism (DSTM), Presentation: IETF 54th Meeting, Yokohama, Japan, Jul. 15-19, 2002.*
Degermark et al. , IP Header Compression, RFC 2507, Feb. 1999.*

(Continued)

*Primary Examiner* — David Lazaro
*Assistant Examiner* — Robert Shaw
(74) *Attorney, Agent, or Firm* — Ido Tuchman; William J. Stock

(57) ABSTRACT

A network system adopting a first IP protocol is provided. The network system includes an address allocating server and a communication terminal supporting both the first IP protocol and a second IP protocol, wherein the address allocating server dynamically allocates an address of the second IP protocol to the communication terminal. The communication terminal includes a dynamic address manager for acquiring the dynamically allocated address of the second IP protocol of the communication terminal from the address allocating server and a second IP protocol address of the destination of a second IP protocol packet from a second IP protocol application, and an address adapter for encapsulating the second IP protocol packet from the second IP protocol application into a first IP protocol packet, wherein the second IP protocol address of the communication terminal in the header of the second IP protocol packet and the second IP protocol address of the destination are encapsulated into the first IP protocol packet.

17 Claims, 8 Drawing Sheets

U.S. PATENT DOCUMENTS

| | | | |
|---|---|---|---|
| 6,038,233 A * | 3/2000 | Hamamoto et al. | 370/401 |
| 6,469,998 B1 * | 10/2002 | Burgaleta Salinas et al. | 370/338 |
| 6,708,219 B1 * | 3/2004 | Borella et al. | 709/245 |
| 6,804,234 B1 | 10/2004 | Chow | 370/389 |
| 7,031,328 B2 * | 4/2006 | Thubert et al. | 370/401 |
| 7,088,726 B1 * | 8/2006 | Hamamoto et al. | 370/401 |
| 7,188,191 B1 * | 3/2007 | Hovell et al. | 709/245 |
| 7,340,746 B2 * | 3/2008 | Deshpande | 719/328 |
| 7,424,019 B1 * | 9/2008 | Kopelman et al. | 370/392 |
| 7,554,991 B2 * | 6/2009 | Sbida | 370/395.5 |
| 7,818,563 B1 * | 10/2010 | Dwork et al. | 713/151 |
| 2002/0159465 A1 * | 10/2002 | Watanuki et al. | 370/401 |
| 2002/0198881 A1 * | 12/2002 | Banerjee et al. | 707/10 |
| 2003/0185236 A1 * | 10/2003 | Asano et al. | 370/469 |
| 2004/0013130 A1 * | 1/2004 | Blanchet et al. | 370/466 |
| 2004/0093434 A1 * | 5/2004 | Hovell et al. | 709/249 |
| 2004/0107287 A1 | 6/2004 | Ananda | 709/230 |
| 2004/0162909 A1 * | 8/2004 | Choe et al. | 709/230 |
| 2004/0199666 A1 * | 10/2004 | King et al. | 709/238 |
| 2004/0246991 A1 * | 12/2004 | Tsuzuki et al. | 370/466 |
| 2005/0152298 A1 * | 7/2005 | Thubert et al. | 370/312 |
| 2005/0185620 A1 * | 8/2005 | Lee et al. | 370/331 |
| 2005/0190713 A1 * | 9/2005 | Watanuki et al. | 370/315 |
| 2005/0249134 A1 * | 11/2005 | Lin | 370/278 |
| 2005/0267954 A1 * | 12/2005 | Lewis et al. | 709/221 |
| 2006/0168267 A1 * | 7/2006 | Fernandes et al. | 709/230 |
| 2006/0227792 A1 * | 10/2006 | Wetterwald et al. | 370/395.52 |
| 2007/0081512 A1 * | 4/2007 | Takeda et al. | 370/349 |
| 2008/0273461 A1 * | 11/2008 | Liang et al. | 370/235 |

OTHER PUBLICATIONS

Stevens—TCP_IP Illustrated, vol. I (1993) IP format.*
Blanchet, IPv6 Transition (Or migration, co-existence, integration), North American IPv6 Summit (2004).*
Bound, Dual Stack Transition Mechanism, <draft-bound-dstm-exp-00.txt> Hewlett Packard, Aug. 2003.*
Blanchet et al, DSTM IPv4 over IPv6 tunnel profile for Tunnel Setup Protocol(TSP), Jul. 1, 2002.*
Tsuchiya et al., Dual Stack Hosts using the "Bump-In-the-Stack" Technique (BIS), RFC 2767, Feb. 2000.*
S. Lee, M. Shin, Y. Lee, E, Nordmark, Dual-Stack Hosts Using in the API (BIA) , RFC 3338, (Oct. 2002).*
Gilligan and Nordmark, Transition Mechanisms for IPv6 Hosts and Routers, RFC 1933, Apr. 1996.*
Droms et al. DHCPv6 RFC 3315 (Jul. 2003).*
Droms, Dynamic Host Configuration Protocol, RFC 2131 (Mar. 1997).*
Draves, Default Address Selection in IPv6, RFC3484 (Feb. 2003).*
Hinden and Deering, IP Version 6 Addressing Architecture, RFC2373 (Jul. 1998).*
Park and Choe, An IPv4-to-IPv6 Dual Stack Transition Mechanism Supporting Transparent Connections between IPv6 Hosts and IPv4 Hosts in Integrated IPv6/IPv4 Network, IEEE Communications Society, 0-7803-8533-0/04, (2004).*
Gilligan and Nordmark, Transition Mechanisms for IPv6 Hosts and Routers, RFC 2893, Aug. 2000.*
Carpenter and Moore, Connection of IPv6 Domains via IPv4 Clouds, RFC 3056, Feb. 2001.*
Waddington & Chang, Realizing the Transition to IPv6, IEEE Communications Magazine, IEEE, Jun. 2002, pp. 138-148.*
Bound et al, Dual Stack Transition Mechanism (DSTM), <draft-ietf-ngtrans-dstm-08.txt>, Jul. 2002.*
Blanchet, IPv6 Transition (Or migration, co-existence, integration), North American IPv6 Summit (2004) http://www.vsix.net/other/summit/summit2004/usipv6.unixprogram.com/North_American_IPv6_Summit_2004/IPv6_Tutorial/marc_blanchet_tutorial_ipv6_transition.pdf).*
Komiyama, "Investigation of Transition Technologies From IPv4 to IPv6 in Network Environment", Unisys Technology Review, vol. 23/No. 2 (2003) pp. 252-272.*
Lee et al, A Flexible Transition Scheme within a Dual Stack Host HSI 2003, LNCS 2713, Springer-Verlag Berlin Heidelberg 2003, pp. 486-495.*
Park, Lee, and Choe, An IPv4-to-IPv6 Dual Stack Transition Mechanism Supporting Transparent Connections between IPv6 Hosts and IPv4 Hosts in Integrated IPv6/IPv4 Network, IEEE Communications Society, 0-7803-8533-0/04, (2004).*
Afifi and Toutaine—Methods for IPv4-IPv6 Transition, ISCC, The Fourth IEEE Symposium on Computers and Communications, 1999, pp. 478-484.*
Afifi and Toutaine, Dynamic Tunneling: A new method for the IPv4-IPv6 Transition, Dec. 18, 1998.*
Vieira et al , "Description of IPv4/IPv6 transition strategies", Laboratories Over Next Generation Networks (LONG) Project Deliverable, May 2001.*
M. Blanchet, XP-002206650 Memorandum, pp. 1-8 (Feb. 22, 2002).
Examination Report for EPO Patent Application No. 06763124.2-2413, European Patent Office, pp. 1-5 (Sep. 14, 2009).
Investigation of Transition Technologies from IPv 4 to IPv 6 in Network Environment, Unisys Technology Review 78, pp. 82-102, Aug. 2003.

* cited by examiner

Fig. 3
| IPv4 address | IPv6 address |
|---|---|
| IPv4 address of the host 1 | IPv6 address of the host 1 |
| IPv4 address of the host 2 | IPv6 address of the host 2 |
| ... | ... |
| IPv4 address of the host N | IPv6 address of the host N |
Fig. 6A
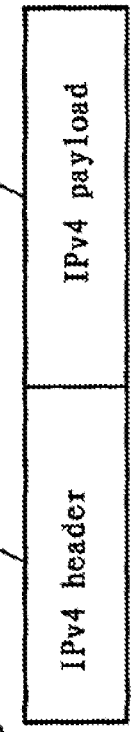
Fig. 6B
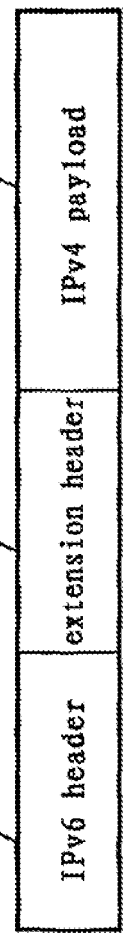

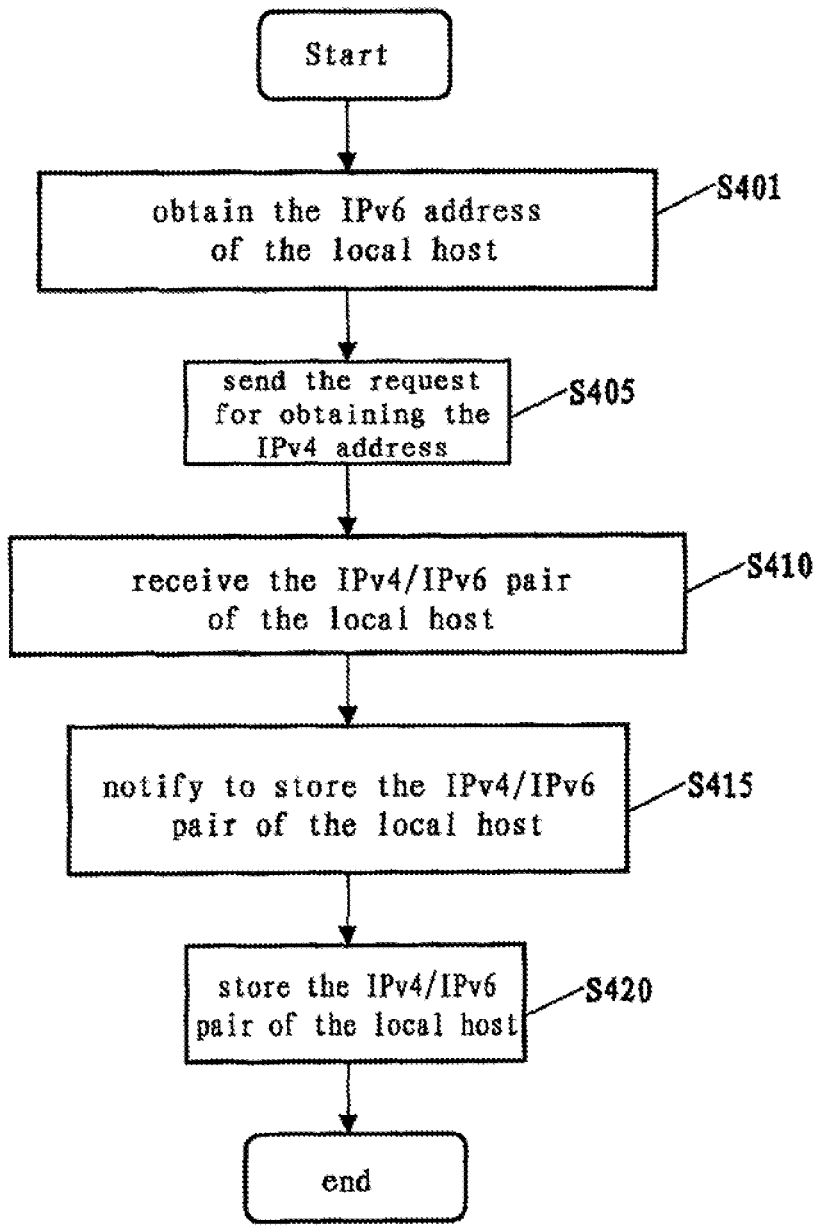

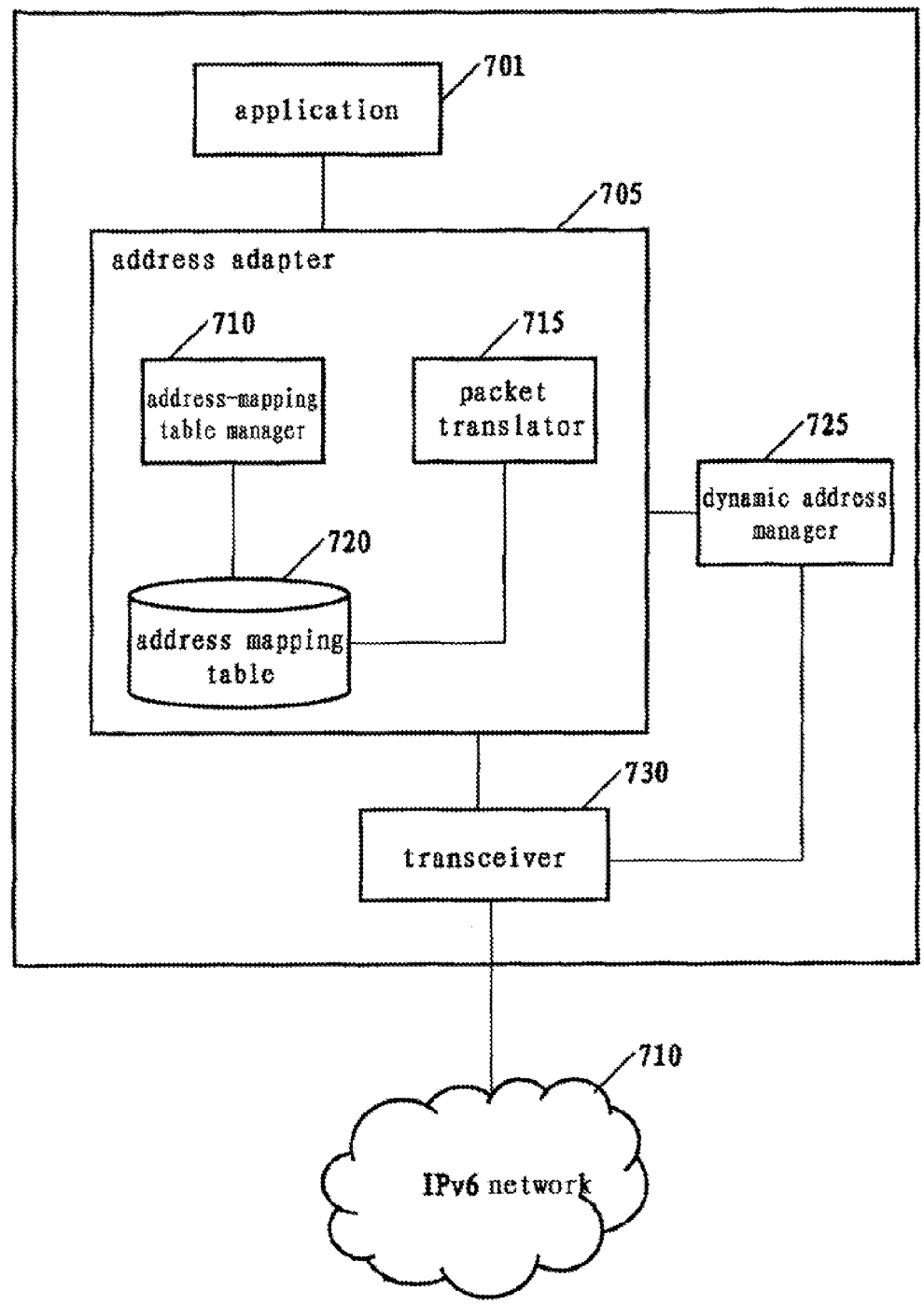

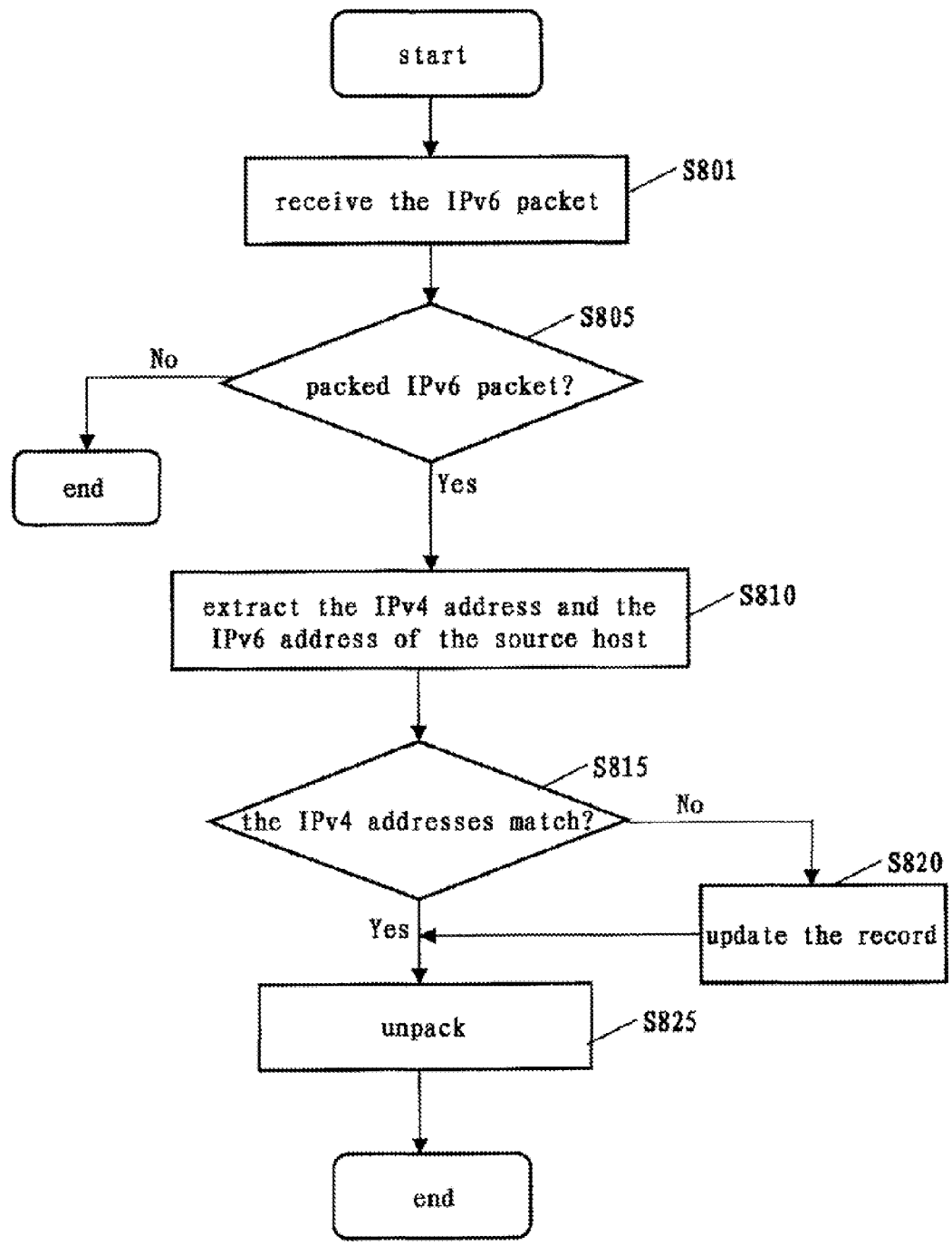

METHOD FOR IPV4 APPLICATION TRANSITION OVER IPV6 NETWORKS

CROSS-REFERENCE TO RELATED APPLICATIONS

This application is filed under 35 U.S.C. 371(c) claiming priority of PCT Application No. PCT/EP2006/062268 filed May 12, 2006 and Chinese Patent Application No. 200510072984.5 filed May 25, 2005, the entire text of which are specifically incorporated by reference herein.

FIELD OF THE INVENTION

The present invention relates to a network system, a method of managing the network system, a communication terminal and a method for sending packets.

BACKGROUND OF THE INVENTION

With the increasing expansion of the Internet, the existing IPv4 addresses composed of 32 bits are scarce. Accordingly, an IPv6 protocol employing an IP address of 128 bits has been proposed to thoroughly solve the problem of scarcity of the IPv4 addresses. IPv6 protocol has significant improvements on addresses capacity, security, network management, mobility and quality of service, etc. Before IPv6 protocol becomes the mainstream protocol, IPv4 protocol is continuously used, thus the coexistence of IPv4 network and IPv6 network occurs. In addition, due to imbalance of address allocation, some countries or regions still have enough IPv4 address space for allocation, thus IPv4 network will exist in these countries and regions for a long time. In a predictable future, IPv4 network and IPv6 network will coexist for a long time.

A situation exists today, which is an IPv4 application can not run in an IPv6 environment, and an IPv6 application can not run in an IPv4 environment. In addition, during transition from IPv4 to IPv6, since most of the existing applications are based on IPv4 protocol and IPv6 applications and services are relatively fewer than mature IPv4 applications and services, the IPv6 network resources are inevitably wasted.

In view of the above situation, the solution of enabling the existing IPv4 applications to run over the IPv6 network inevitably requires to be implemented. That is to say, it is desired to not only deploy new IPv6 networks, but also continue to use existing IPv4 application resources.

There are several solutions proposed in the prior art for the above problem. One is Dual Stack Transition Mechanism (DSTM). The object of DSTM is to solve the problem of connecting the dual stack hosts in the pure IPv6 network to the existing IPv4 hosts or applications. The gist of DSTM is to provide a measure for obtaining a temporal IPv4 address for an IPv6 node, and simultaneously add a gateway between the networks of different network protocols to achieve transmitting IPv4 traffic over the pure IPv6 network by using an IPv4 over IPv6 tunnel. This solution regards the IPv6 network as an IPv4 intranet, and thus is effective only in the intranet, and can not support an IPv4 address embedded application.

Another is an address translation mechanism, for example, Network Address Translator-Protocol Translator (NAT-PT); Bump in the Stack (BIS) and Bump in the API (BIA), etc. Under the address translation mechanism, the address of the IPv4 packet is translated into the IPv6 address and then transmitted in the IPv6 network, and vice versa. However, this translation mechanism inevitably results in large additional effort. In particular, when the IPv4 packet is embedded with an IPv4 address, an application gateway/proxy, etc, is required to translate the address embedded in the packet, which requires more translation amount and occupies more system resources. For example, for BIA, since it is required to transform the IP address (for example, FTP) embedded in the application layer protocol, such mechanism may be inapplicable to those new applications with addresses contained in their load.

A further solution is to modify the code for upgrading the IPv4 application to make the IPv4 application to be an IPv6 application, which requires re-coding and testing, and consumes time and efforts.

In the prior art, a DTTS technique has been proposed to solve the problem of running the IPv4 application over the IPv6 network. DTTS technique does not require NAT or application gateway/proxy, etc. However, DTTS occupies limited IPv4 address resources for allocating dynamic addresses when transforming the addresses, and transforms the IPv4 address into the IPv6 address by using an IPv4 compatible address when transforming the addresses, thus the transmitting apparatus needs 128-bit static routing configuration, which results in a heavy cost.

SUMMARY OF THE INVENTION

To ameliorate the problems mentioned above in the prior art, an object of the invention is to provide seamless transition of applications between different protocols.

The present invention thus provides, in a first aspect, a network system adopting a first IP protocol, the network system comprising an address allocating server and a communication terminal supporting both the first IP protocol and a second IP protocol different from the first IP protocol, wherein the address allocating server dynamically allocating an address of the second IP protocol to the communication terminal, characterized in that: said communication terminal comprises: a dynamic address manager for acquiring said dynamically allocated address of the second IP protocol of said communication terminal from the address allocating server and a second IP protocol address of the destination of a second IP protocol packet from a second IP protocol application, and an address adapter for encapsulating the second IP protocol packet from the second IP protocol application into a first IP protocol packet, wherein the second IP protocol address of said communication terminal in the header of the second IP protocol packet and the second IP protocol address of the destination are encapsulated into said first IP protocol packet, and said communication terminal sends out said encapsulated first IP protocol packet.

A second aspect of the present invention provides a management method of a network system adopting a first IP protocol, the network system comprising a communication terminal supporting both the first IP protocol and a second IP protocol different from the first IP protocol, characterized in that: in said communication terminal, acquiring a dynamically allocated address of the second IP protocol of said communication terminal from an address allocating server and a second IP protocol address of the destination of a second IP protocol packet from a second IP protocol application; in said communication terminal, encapsulating the second IP protocol packet from the second IP protocol application into a first IP protocol packet, wherein the second IP protocol address of said communication terminal in the header of the second IP protocol packet and the second IP protocol address of the destination are encapsulated into said first IP protocol packet, and in said communication terminal, sending out said encapsulated first IP protocol packet.

A third aspect of the present invention provides a communication terminal supporting both a first IP protocol and a second IP protocol different from the first IP protocol, the communication terminal connected to an address allocating server for dynamically allocating an address of the second IP protocol thereto, characterized in that: said communication terminal comprises: a dynamic address manager for acquiring said dynamically allocated address of the second IP protocol of said communication terminal from the address allocating server and a second IP protocol address of the destination of a second IP protocol packet from a second IP protocol application, and an address adapter for encapsulating the second IP protocol packet from the second IP protocol application into a first IP protocol packet, wherein the second IP protocol address of said communication terminal in the header of the second IP protocol packet and the second IP protocol address of the destination are encapsulated into said first IP protocol packet, and said communication terminal sends out said encapsulated first IP protocol packet.

A fourth aspect of the present invention provides a method of sending packet for a communication terminal supporting both a first IP protocol and a second IP protocol different from the first IP protocol, the communication terminal connected to an address allocating server for dynamically allocating an address of the second IP protocol thereto, characterized in that, the method comprising: acquiring a dynamically allocated address of the second IP protocol of said communication terminal from the address allocating server and a second IP protocol address of the destination of a second IP protocol packet from a second IP protocol application, and in said communication terminal, encapsulating the second IP protocol packet from the second IP protocol application into a first IP protocol packet, wherein the second IP protocol address of said communication terminal in the header of the second IP protocol packet and the second IP protocol address of the destination are encapsulated into said first IP protocol packet, and said communication terminal sends out said encapsulated first IP protocol packet.

According to the invention, the second IP protocol application is enabled to run seamlessly between the dual-stack hosts of the first IP protocol network.

According to the invention, since the upper layer application requires no modification, the invention is transparent to the upper layer application and will not exert an additional load to the upper layer users.

BRIEF DESCRIPTION OF THE DRAWINGS

These and other advantages of the invention will be more apparent by the detained description of the preferred embodiments of the invention, with reference to the accompanying drawings, in which

FIG. 3 shows the structure of an address-mapping table according to an embodiment of the invention.

FIGS. 4A and 4B are flowchart diagrams showing obtaining the IPv4 address of the destination host according to an embodiment of the invention.

FIGS. 6A and 6B are schematic diagram showing the packet format of encapsulating the IPv4 packet into the IPv6 packet according to an embodiment of the invention.

FIG. 7 is a block diagram showing the function of the destination host.

FIG. 8 is a flowchart diagram showing a process of the destination host.

DETAILED DESCRIPTION OF THE PREFERRED EMBODIMENT

For the sake of illustration, the invention is based on the following network environment, that is, the host for communication is a dual-stack host, which operates in a pure IPv6 network and runs existing IPv4 applications. However, the invention is not restricted to IPv4 protocol and IPv6 protocol, and can be applied to any network employing an IP protocol.

An embodiment of the invention will be described now with reference to FIG. 1.

Figure 1:
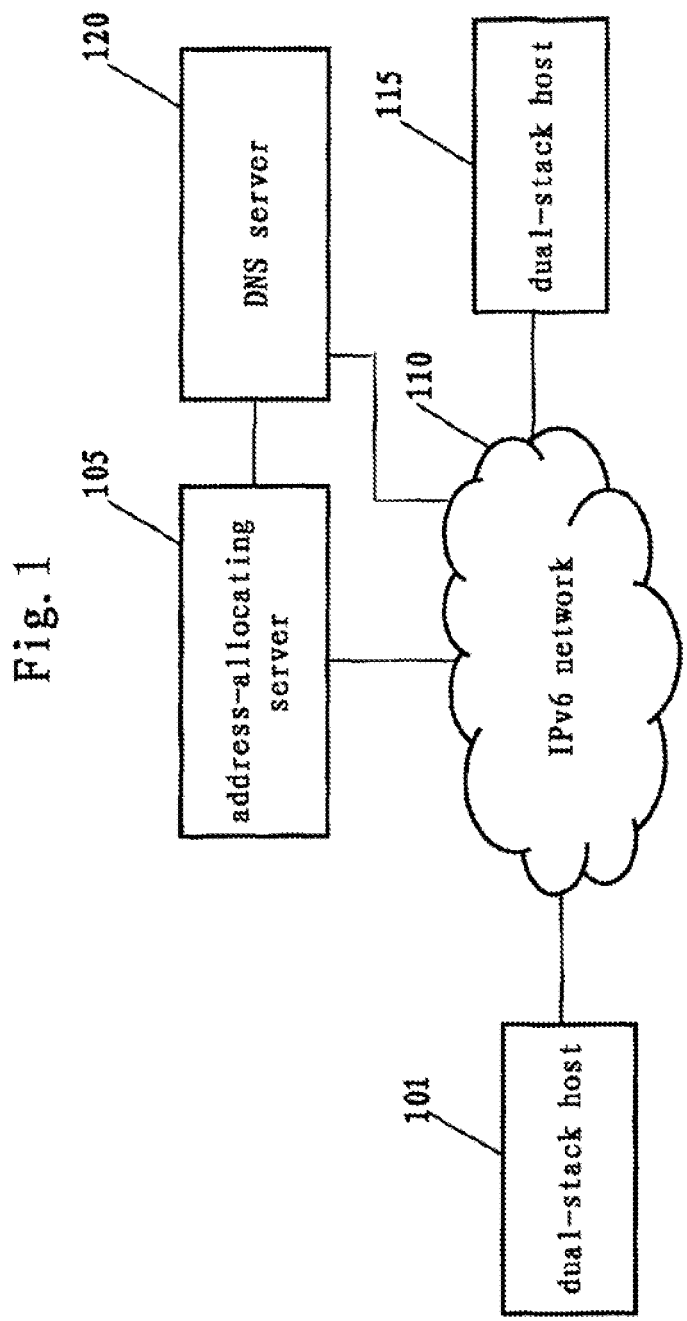
FIG. 1 is a schematic diagram showing an embodiment of the invention.

In FIG. 1, a dual-stack host 101 and a dual-stack host 115 are dual-stack hosts that support both IPv4 protocol and IPv6 protocol in an IPv6 network. For those skilled in the art, the invention can be applied to any communication terminal that support IPv4 protocol stack and IPv6 protocol stack. For the sake of illustration, the terminal is referred to as the host hereinafter. The hosts 101 and 115 have respective IPv6 addresses. The hosts 101 and 115 communicate with each other through an IPv6 network 110.

The hosts 101 and 115 run not only IPv4 applications but also IPv6 applications. According to an embodiment of the invention, when both the hosts 101 and 115 run the IPv4 applications and the IPv4 applications communicate with each other through the IPv6 network, the IPv4 applications can be run seamlessly over the IPv6 network. The above procedure will be described in detail later.

A DNS server 120, in response to a request for acquiring the IPv6 address of the local or destination host from the host 101 or 115, analyzes and acquires IPv6 address of the local or destination host, and returns it to the host 101 or 115, or simultaneously sends the IPv6 address of the local or destination host to an address allocating server 105 to allocate a corresponding IPv4 address.

The address-allocating server 105, in response to a request for allocating a temporal IPv4 address from the host 101 or 115, dynamically allocates the IPv4 address, and reclaims the allocated IPv4 address for future usage, according to actual situations.

It would be appreciated for those skilled in the art that, the DNS server 120 and the address allocating server 105 may be combined together to achieve the combined function.

Figure 2:
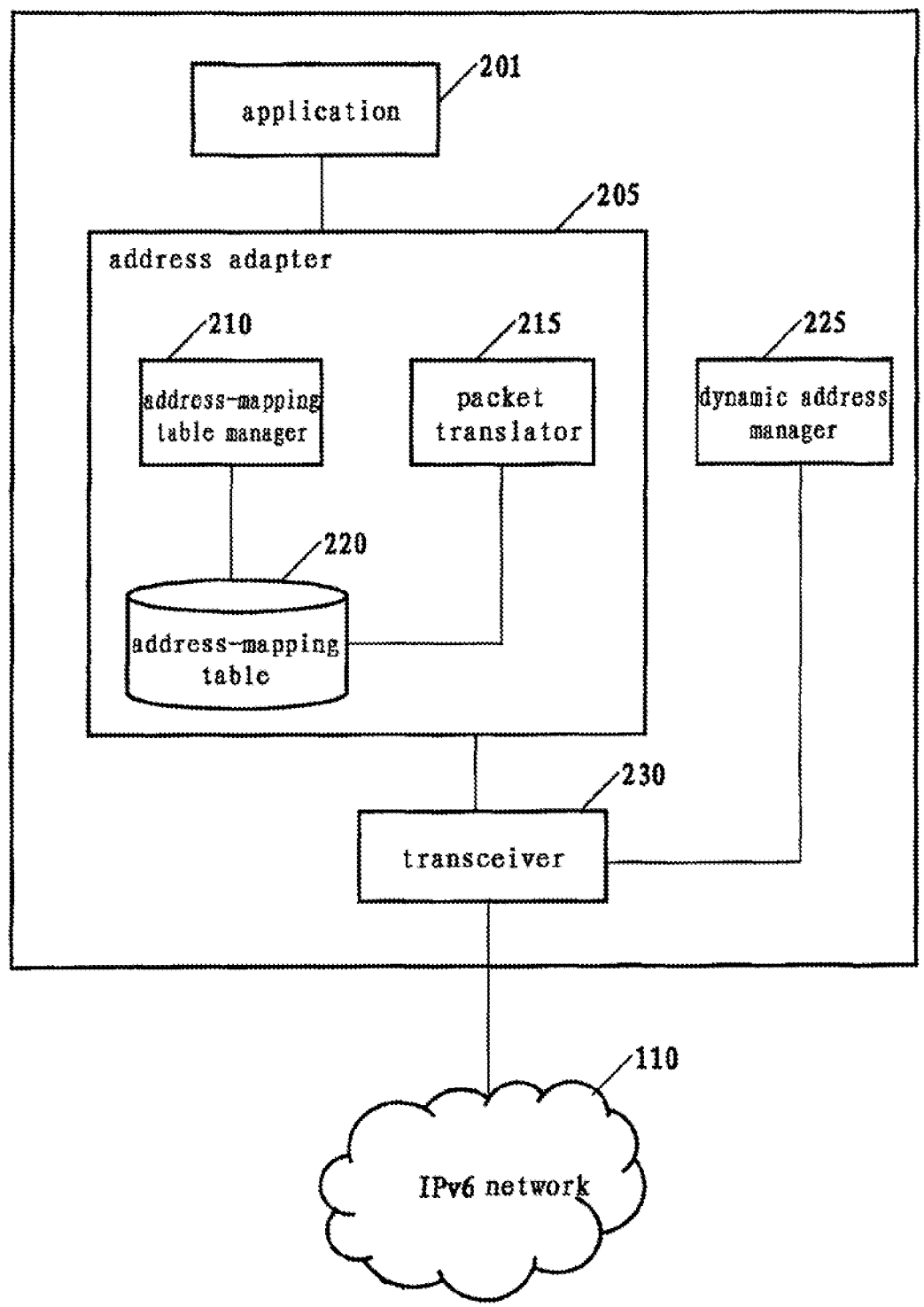
FIG. 2 is a block diagram showing the function of the host according to an embodiment of the invention.

FIG. 2 is a block diagram showing the function of a source host according to an embodiment of the invention. The host includes at least an address adapter 205 and a dynamic address manager 225.

The address adapter 205 encapsulates an IPv4 packet from an IPv4 application 201 into an IPv6 packet, and vice versa, and maintains the correspondence between the IPv4 and IPv6 addresses of the host. The operation of the address adapter 205 will be described in detail later.

The dynamic address manager 225 acquires the IPv4 address of the local or destination host dynamically (temporally) from the address allocating server 105, and releases the acquired IPv4 address in order to dynamically manage the IPv4 address. The function of the dynamic address manager 225 will be described in detail later.

The address adapter 205 includes an address-mapping table manager 210, a packet translator 215 and an address-mapping table 220.

The address-mapping table manager 210 manages the address-mapping table 220. The packet translator 215 encapsulates the IPv4 packet from the IPv4 application 201 into the IPv6 packet, and vice versa, with reference to the address-mapping table 220. The address-mapping table 220 may be stored in a storage not shown in FIG. 1.

The above functional blocks may be combined or separated to achieve the combined or separated function. For example, the address-mapping table manager 210 and the dynamic address manager 225 may be combined into a functional block to achieve the dynamic management of the addresses in the address-mapping table. In addition, the address adapter 205 and the dynamic address manager 225 are preferably located between the IP layer and the Link and Physical layer to achieve the transformation of IP addresses.

The IPv4 application 201 may be any IPv4 application in the application layer.

FIG. 3 shows the structure of the address-mapping table 220.

The address-mapping table 220 correspondingly stores the IPv4 address and the IPv6 address of hosts in the network. According to the invention, the address-mapping table 220 maintains not only the IPv4/IPv6 address pair of the local host, but also the IPv4/IPv6 address pair of the destination host used by the IPv4 application.

The process of acquiring the IPv4 address of the local host or destination host dynamically (temporally) and storing it according to the invention is described below.

FIG. 4A shows the process of dynamically acquiring the IPv4 address of the local host and storing it according to the invention.

First, in step S401, when the address-mapping table 220 is initialized, for example, each time the host logs on the IPv6 network or the first IPv4 application of the local host starts to run, an IPv6 address manager not shown in the invention acquires the IPv6 address of the local host from the DNS server 120 through a transceiver 230.

In step S405, the dynamic address manager 225 sends a request containing the IPv6 address of the local host acquired by the IPv6 address manager to the address allocating server 105.

The address-allocating server 105 dynamically allocates an IPv4 address to the host in response to the received request, and transmits the IPv4/IPv6 address pair of the host to the transceiver 230.

In step S410, the dynamic address manager 225 acquires the IPv4/IPv6 address pair of the local host from the transceiver 230.

Then in step S415, the dynamic address manager 225 informs the address-mapping table manager 210 that the IPv4/IPv6 address pair of the local host will be correspondingly stored.

In step S420, in response to the notification, the address-mapping table manger 210 correspondingly stores the IPv4/IPv6 address pair of the local host into the address-mapping table 220.

Through the above processes, the local host will temporally acquire an IPv4 address when the address-mapping table is initialized. Thereafter, all the IPv4 applications coexisted in the local host will use the same IPv4 address. Therefore, according to the invention, the IPv4 address space will be used farthest.

It will be appreciated by those skilled in the art that, the above processes may be appropriately modified. For example, the local host may directly send the request for acquiring the IPv4/IPv6 address pair to the DNS server 120 which acquires a dynamically allocated IPv4 address from the address allocating server 105 and then returns the IPv4/IPv6 address pair to the local host.

In addition, although in the above depiction, the local host acquires the IPv4/IPv6 address pair from the address allocating server, those skilled in the art would appreciate that, the address allocating server may only return the IPv4 address.

Figure 4B:
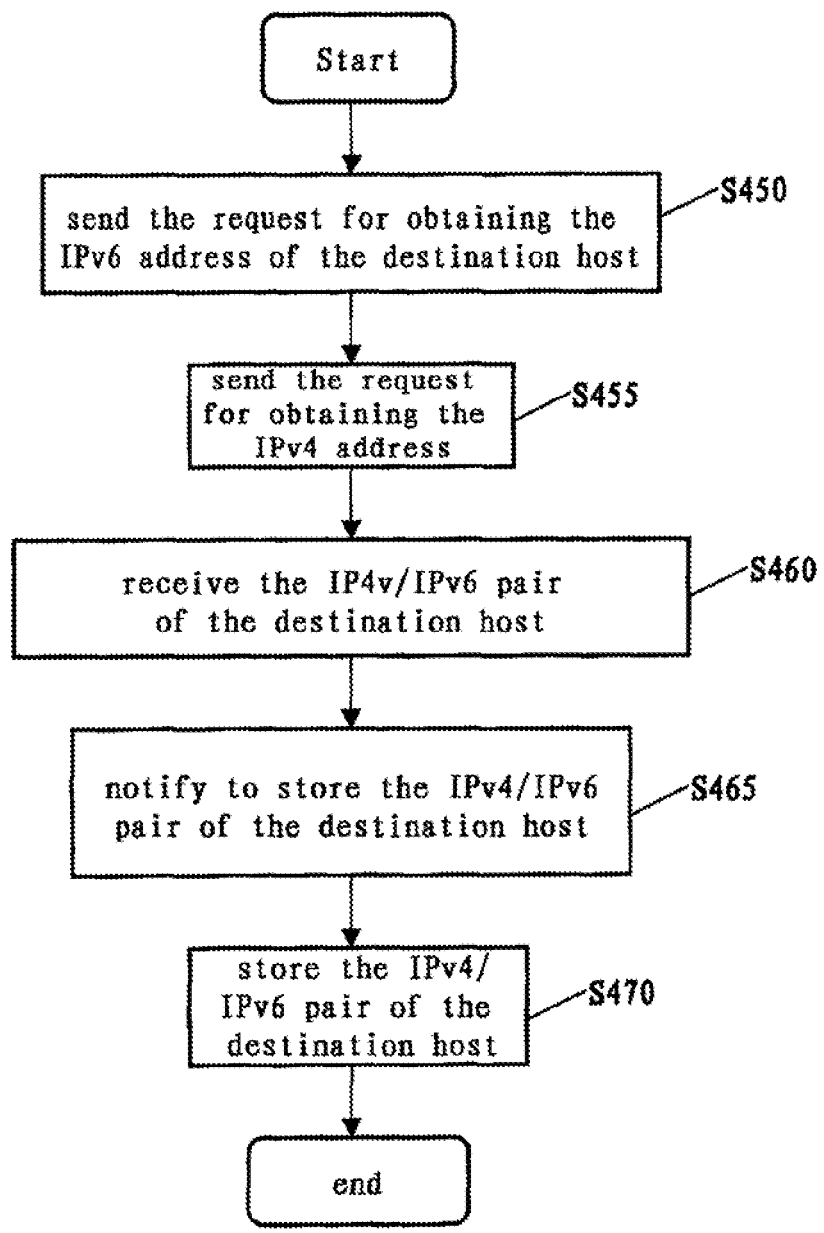

FIG. 4B shows a flowchart for obtaining the IPv4 address of the destination host according to the invention.

First, in step S450, the IPv4 application 201 of the local host sends through the transceiver 230 to the DNS server 120 a request for acquiring the IPv6 address of the destination host.

In response to the request, the DNS server 120 returns the IPv6 address of the destination host to the local host.

In step S455, the dynamic address manager 225 sends the request containing the IPv6 address of the destination host to the address allocating server 105 through the transceiver 230, in order to request acquiring the IPv4/IPv6 address pair of the destination host.

The address-allocating server 105, in response to the received request, allocates an IPv4 address to the destination host dynamically, and sends the IPv4/IPv6 address pair of the destination host to the transceiver 230.

In step S460, the dynamic address manager 225 acquires the IPv4/IPv6 address pair of the destination host from the transceiver 230.

Then in step S465, the dynamic address manager 225 informs the address-mapping table manager 210 to correspondingly store the IPv4/IPv6 address pair of the destination host.

In step S470, in response to the notification, the address-mapping table manager 210 correspondingly stores the IPv4/IPv6 address pair of the destination host into the address-mapping table 220.

Through the above processes, the IPv4 address of the destination host will be temporally obtained when running the IPv4 application.

Therefore, when generating the IPv4 packet for the IPv4 application, the header of the IPv4 packet may be formed by directly referring to the IPv4 address in the address-mapping table 220. Since the process for forming the IPv4 header may be achieved by using existing techniques, the description thereof is thus omitted. It is assumed in the invention that, the header of the packet from the IPv4 application includes the IPv4 address of the source and destination.

For those skilled in the art, the IPv4/IPv6 address pair of the destination host may be obtained by other known means, for example, the IPv4/IPv6 address pair of the counterpart may be obtained by a direct communication with the destination host.

FIGS. 6A and 6B are diagrams showing the format of the packet according to the invention, when the IPv4 packet is encapsulated into the IPv6 packet.

FIG. 6A shows the format of the IPv4 packet according to the invention, including an IPv4 header 601 and an IPv4 payload 605.

FIG. 6B shows the format of the IPv6 packet according to the invention, when the IPv4 packet is encapsulated into the IPv6 packet.

The IPv6 header 601' is a conventional IPv6 header under IPv6 protocol, which includes the IPv6 addresses of the source and destination hosts corresponding to the IPv4 addresses of the source and destination hosts contained in the IPv4 header.

The IPv4 payload 605' and the IPv4 payload 605 have the same content.

An extension header 602', compared with the IPv4 header 602, further reserves the information of the original IPv4 header of the IPv4 packet from the IPv4 application, i.e., the IPv4 header information containing the IPv4 address of the source and destination hosts. In this embodiment, the original IPv4 header is totally placed in the extension header. However, more preferably, the IPv4 header is compressed, but at least the IPv4 address information of the source and destination hosts is placed in the extension header, in order to reduce information occupancy. In addition, a flag is optionally arranged in the extension header 602' to identify whether the IPv6 packet has encapsulated the IPv4 header. In this manner, the original IPv4 header information will be extracted by using the IPv6 packet format in the invention, when the IPv6 extension header is processed in the IPv6 protocol stack at the destination host. And the original IPv4 packet will be restored by using the extracted original IPv4 header information together with the IPv4 overhead, without resulting in processing the IPv4 packet by an IPv6 application.

In the invention, although the original IPv4 header information is included as the content of the extension header in the IPv6 packet and occupies the information resource, the inventor has discovered via research that, the extension header in the IPv6 packet may absolutely include optional information that needs to be processed by a destination node, without increasing the system overhead.

A preferable method is that, when encapsulating, for example, when encapsulating the IPv4 packet into the IPv6 packet, idle fields in the IPv4 packet may be deleted to save the space occupied by the information.

While encapsulating the IPv6 packet into the IPv4 packet, idle fields in the IPv6 packet may be deleted to save the space occupied by the information.

Figure 5:
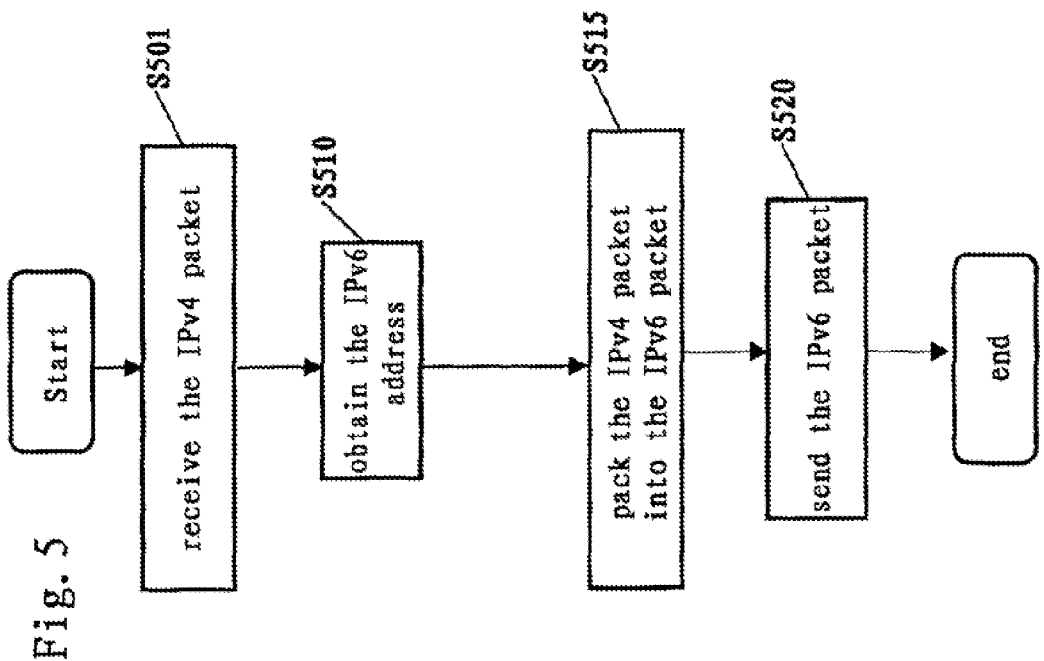
FIG. 5 is a flowchart diagram showing a process of encapsulating the IPv4 packet from an IPv4 application into the IPv6 packet according to an embodiment of the invention.

FIG. 5 shows a process of transforming the IPv4 packet from the IPv4 application 201 into the IPv6 packet according to the invention.

First, in step S501, the packet translator 215 receives the IPv4 packet from the IPv4 application 201. In step S510, the packet translator 215 looks up the address-mapping table 220 to search for the IPv6 address corresponding to the destination host. Then the process advances to the step S515 where the IPv4 packet is encapsulated into the IPv6 packet according to the format as shown in FIG. 6B, wherein the original IPv4 header is encapsulated into the extension header 602'.

Then in step S520, the transceiver 230 sends out the encapsulated IPv6 packet through the IPv6 network 110.

FIG. 7 is a block diagram showing the function of the destination host.

The structure of the destination host is the same as that of the source host as shown in FIG. 2, including at least an address adapter 705 and a dynamic address manager 725. The address adapter 705 decapsulates the IPv6 packet and transforms it into the original IPv4 packet.

The dynamic address manager 225 may acquire the IPv4 address of the local host from the address allocating server 105 dynamically (temporally) according to the operation of FIG. 4A, and may acquire the IPv4 address of the local host from the encapsulated IPv6 packet received from the counterpart.

The address adapter 205 includes the address-mapping table manager 210, the packet translator 215 and the address-mapping table 220. The function of the above functional blocks will be described in detail later.

Those skilled in the art would appreciate that the above functional blocks may be combined or separated to achieve the combined or separated function. For example, the address-mapping table manager 710 and the dynamic address manager 725 may be combined into a function block to achieve the dynamic management of the addresses in the address-mapping table. In addition, the address adapter 705 and the dynamic address manager 725 are located between the IP layer and the Link and Physical layer to achieve the transformation of IP addresses.

FIG. 8 shows a process after the destination host receives the IPv6 packet.

In step S801, when the transceiver 730 of the destination host receives the IPv6 packet, it forwards the IPv6 packet to the packet translator 715 of the destination host.

In step S805, the packet translator 715 judges whether the IPv6 packet has encapsulated the IPv4 packet, for example, by detecting the flag arranged in the extension header 602'. If it is judged that the IPv6 packet has not encapsulated the IPv4 packet, the IPv6 packet is delivered to the IP layer for normal IPv6 packet process.

If the IPv6 packet has encapsulated the IPv4 packet, the process advances to step S810.

In step S810, the packet translator 715 extracts the IPv6 address of the source host from the IPv6 packet encapsulating the IPv4 packet, and forwards the same to the address-mapping table manager 710.

In step S815, the address-mapping table manager 710 compares the IPv4 address of the source host in the extension header 602' with the record in the address-mapping table 220, with the extracted source IPv6 address as an index.

When there is no IP address record corresponding to the source host or the recorded IPv4 address of the source host is not in consistent with the source IPv4 address extracted from the IPv6 packet, the process advances to the step S820, where the address-mapping table manager 710 modifies the corresponding record in the address-mapping table 220 to the IPv4/IPv6 address pair in the IPv6 packet. Then the process advances to step S825. The modification operation made by the address-mapping table when the recorded IPv4 address of the source host is inconsistent with the source IPv4 address extracted from the IPv6 packet, substantively and simultaneously performs the release operation of the corresponding IPv4/IPv6 address pair of the source host from the destination host.

When the recorded IPv4 address of the source host is consistent with the source IPv4 address extracted from the IPv6 packet, the process advances to step S825 where the packet translator 715 transforms the encapsulated IPv6 packet into the IPv4 packet.

In this way, the IPv4 application 701 of the destination host may use the transformed IPv4 packet as its original form and continue to run as usual.

The process of transmitting data from the application 701 of the destination host to the application 201 of the source host is the same as the process of transmitting data from the application 201 of the source host, the description thereof is thus omitted.

It can be seen from the above depiction that, by encapsulating the original IPv4 packet into the IPv6 packet, the invention enables the destination host to decapsulate the IPv4 packet from the IPv6 packet for use in the IPv4 application, without modifying the IPv4 application. In particular, when the IPv4 packet is embedded with the IPv4 address, the advantage of the invention is particularly prominent. Therefore, the invention improves the flexibility of running the IPv4 application over the IPv6 network in a simple way.

In addition, the invention achieves the normally running of the IPv4 application over the IPv6 network only by encapsulating and decapsulating the IPv6 packet at the host side without adding additional elements for transforming addresses such as application gateway or proxy, the invention enables the IPv4 application to run normally over the IPv6 network with a lower cost and in a convenient form.

According to the invention, the dynamic address manager at the host side effectively uses the IPv4 address space, to enable the IPv4 application to continue to run over the pure IPv6 network.

In addition, although the foregoing is described by taking example for the dual-stack host in the IPv6 network, those skilled in the art would appreciate that, the invention may be further extended to make IPv4 applications (for example, in the local host) communicate with IPv6 applications (for example, in the remote host) in the pure IPv6 network, as BIS/BIA does; or make IPv4 applications communicate with each other between the IPv6 network and the IPv4 Internet, as DSTM does. The above implementations only require adding a gateway to support an IPv4-over-IPv6 tunnel.

The process of releasing the IPv4 address according to the invention will be described below.

FIGS. 4A and 4B introduce the process of acquiring the IPv4 address of the source host and the destination host from the address allocating server 105, which is achieved by the address allocating server 105 by using existing dynamic address allocating techniques, such that a plurality of hosts may share limited IPv4 address resource.

The dynamic address manager of the invention further manages the dynamically allocated IPv4 address, and releases the allocated IPv4 address when necessary.

Figure 9:
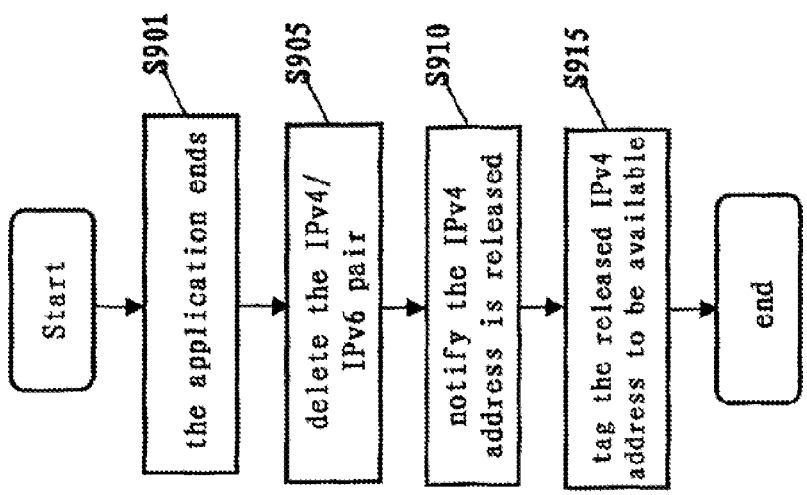
FIG. 9 is a flowchart diagram showing a process of releasing address according to an embodiment of the invention.

The process of releasing addresses according to the invention will be described below with reference to FIGS. 9 and 2.

First, in step S901, the dynamic address manager 225 receives information of ending of the application from the IPv4 application 201.

Here, the so called ending of IPv4 application may be judged according to a definition to the ending of the application by a particular protocol or by an obvious ending frame.

In step S905, the dynamic address manager 225 deletes (or marks) the IPv4/IPv6 address pair of the destination host related to the ended IPv4 application in the address-mapping table 220, and if it is necessary, it may also delete the IPv4/IPv6 address pair of the local host.

In step S910, the dynamic address manager 225 informs the address allocating server 105 the release of the IPv4 address of the destination host (and/or local host).

In step S915, in response to the information, the address allocating server 105 marks the IPv4 address allocated to the destination host (and/or local host) as available, in order to reallocate the IPv4 address to other destination hosts.

In addition, in place of steps S910 and S915, the address allocating server 105 may voluntarily delete the IPv4 address dynamically allocated to the host at its side, when it fails to receive the IPv4 address of the released host from the host for a time period.

Through the above release process, the invention can fully utilize limited IPv4 resource. In particular, even if the host does not power off, the invention can release the IPv4 address timely. It is to be noticed that, the embodiments described above merely intend to illustrate the invention, and do not limit the invention.

The object of the invention can be reached by providing to the system or apparatus directly or indirectly a storage medium storing program code of software for implementing the function of the embodiments, reading out the program code and performing the same by a computer of the system or apparatus. At this time, so long as the system or apparatus has the function of the program, the implementation is not limited to the program.

Therefore, the program code installed in the computer can achieve the invention since a computer can achieve the function of the invention. In other words, the claims of the invention also comprise the computer program for realizing the function of the invention.

Then, so long as the system or apparatus has the function of the program, the program can be executed by any means such as object code, the program executed by the interpreter or the script data provided to the operation system.

The storage medium for providing the program code comprises for example, floppy disk, hard disk, optical disk, magneto-optic disk, CD-ROM, CD-R, CD-RW, magnetic tape, non-volatile storage card, ROM and DVD (DVD-ROM and DVD-R), etc.

For the way of providing the program, a client computer may be connected to a website in the Internet via a browser in the client computer. The computer program of the invention or a compressed file automatically setup by the program may be downloaded to the recording medium such as hard disk. Further, the program according to the invention may be provided by segmenting the program code constituting the program into a plurality of files and downloading the same from different websites. In addition, the claims of the invention also comprise a solution that a WWW server downloads a program file for achieving the function of the invention to a plurality of users.

Moreover, the program according to the invention may be encrypted and stored into the storage medium such as CD-ROM to be distributed to users, which allows the users satisfying certain requirements to download encrypted encryption information via the Internet, and allows the users to decrypt the encrypted program by using the encryption information, such that the program is installed into the computers of the users.

Besides the computer executable program achieving the functions of the embodiments of the invention, the operation system running on the computer may execute all or part of the actual process to achieve the embodiments described above through the process.

Further, after the program code read from the recording medium is written into the function extendable board inserted into the computer and the memory provided in the function extendable unit connected to the computer, CPU provided in the function extendable board and function extendable unit executes all or part of the actual process according to the instruction of the program. The situation where the functions of the above embodiments may be realized by means of the process is also included.

The present invention may have a plurality of varied embodiments within the spirit and scope of the invention. Therefore, it will be appreciated that, the scope of protection of the invention is defined by the following claims, but not limited to the specific embodiments.

While the embodiments of the invention have been described in detail with reference to attached drawings, various changes and modifications may be made to the above embodiments without departing from the spirit and scope of the invention. Therefore, the scope of the invention is only defined by the attached claims.

The invention claimed is:

1. A network system adopting a first IP protocol, the network system comprising:
   an address allocating server and a communication terminal supporting both the first IP protocol and a second IP protocol different from the first IP protocol, the address allocating server dynamically allocating an address of the second IP protocol to the communication terminal, characterized in that: said communication terminal comprises:
a dynamic address manager for acquiring said dynamically allocated address of the second IP protocol of said communication terminal from the address allocating server such that the address of the second IP protocol is temporarily acquired and then released after a specified time interval and acquiring a second IP protocol address of a destination of a second IP protocol packet from a second IP protocol application, and an address adapter for encapsulating the second IP protocol packet from the second IP protocol application into a first IP protocol packet, wherein the second IP protocol address of said communication terminal, included in a header of the second IP protocol packet, and the second IP protocol address of the destination are encapsulated into said first IP protocol packet;
wherein said address adapter further comprises:
an address-mapping table for storing a correspondence between the first IP protocol address and the second IP protocol address; an address-mapping table manager for managing the address-mapping table;
a packet translator for transforming the first IP protocol packet into the second IP protocol packet or transforming the second IP protocol packet into the first IP protocol packet, according to the correspondence stored in the address-mapping table;
wherein said first IP protocol packet is either an IPv4 packet or an IPv6 packet, said second IP protocol packet is an IPv6 packet when said first IP protocol packet is an IPv4 packet and said second IP protocol packet is an IPv4 packet when said first IP protocol packet is an IPv6 packet.

2. The network system according to claim 1, characterized in that: said dynamic address manager is operable to release said dynamically allocated second IP protocol address, in response to a notification of the ending of said second IP protocol application, and said address allocating server is operable to mark said released second IP protocol address as available.

3. The network system according to claim 1, characterized in that: idle fields in the IPv6 packet are deleted while encapsulating the IPv6 packet into the IPv4 packet, and idle fields in the IPv4 packet are deleted while encapsulating the IPv4 packet into the IPv6 packet.

4. The network system according to claim 1 characterized in that: when the communication terminal is a destination, the address adapter transforms the received encapsulated first IP protocol packet into the second IP protocol packet.

5. A method of managing a network system adopting a first IP protocol, the network system comprising a communication terminal supporting both the first IP protocol and a second IP protocol different from the first IP protocol, the method comprising:
in said communication terminal, acquiring a dynamically allocated address of the second IP protocol of said communication terminal from an address allocating server such that the address of the second IP protocol is temporarily acquired and then released after a specified time interval and acquiring a second IP protocol address of a destination of a second IP protocol packet from a second IP protocol application;
in said communication terminal, encapsulating the second IP protocol packet from the second IP protocol application into a first IP protocol packet, wherein the second IP protocol address of said communication terminal, included in the header of the second IP protocol packet, and the second IP protocol address of the destination are encapsulated into said first IP protocol packet, and in said communication terminal, sending out said first IP protocol packet;
storing a correspondence between the first IP protocol address and the second IP protocol address in each communication terminal; transforming the first IP protocol packet into the second IP protocol packet or transforming the second IP protocol packet into the first IP protocol packet, according to the correspondence stored in the address-mapping table;
wherein said first IP protocol packet is either an IPv4 packet or an IPv6 packet, said second IP protocol packet is an IPv6 packet when said first IP protocol packet is an IPv4 packet and said second IP protocol packet is an IPv4 packet when said first IP protocol packet is an IPv6 packet.

6. The method according to claim 5 further comprising: releasing said dynamically allocated second IP protocol address, in response to a notification of the ending of said second IP protocol application.

7. The method according to claim 5 characterized in that: idle fields in the IPv6 packet are deleted while encapsulating the IPv6 packet into the IPv4 packet, and idle fields in the IPv4 packet are deleted while encapsulating the IPv4 packet into the IPv6 packet.

8. The method according to claim 5 characterized in that: when the communication terminal is a destination, a received encapsulated first IP protocol packet is transformed into the second IP protocol packet.

9. A communication terminal supporting both a first IP protocol and a second IP protocol different from the first IP protocol, the communication terminal coupled to an address allocating server for dynamically allocating an address of the second IP protocol thereto, said communication terminal comprises:
a dynamic address manager for acquiring said dynamically allocated address of the second IP protocol of said communication terminal from the address allocating server such that the address of the second IP protocol is temporarily acquired and then released after a specified time interval and acquiring a second IP protocol address of the destination of a second IP protocol packet from a second IP protocol application,
an address adapter for encapsulating the second IP protocol packet from the second IP protocol application into a first IP protocol packet, wherein the second IP protocol address of said communication terminal, included in the header of the second IP protocol packet, and the second IP protocol address of the destination are encapsulated into said first IP protocol packet, and said communication terminal is configured to send said first IP protocol packet,
an address-mapping table for storing a correspondence between the first IP protocol address and the second IP protocol address; an address-mapping table manager for managing the address-mapping table, and
a packet translator for transforming the first IP protocol packet into the second IP protocol packet or transforming the second IP protocol packet into the first IP protocol packet according to the correspondence stored in the address-mapping table;
wherein said first IP protocol packet is either an IPv4 packet or an IPv6 packet, said second IP protocol packet is an IPv6 packet when said first IP protocol packet is an IPv4 packet and said second IP protocol packet is an IPv4 packet when said first IP protocol packet is an IPv6 packet.

10. The communication terminal according to claim 9, characterized in that: in response to a notification of the ending of said second IP protocol application, said dynamic address manager releases said dynamically allocated second IP protocol address and informs said address allocating server of the release.

11. The communication terminal according to claim 9, characterized in that: idle fields in the IPv6 packet are deleted while encapsulating the IPv6 packet into the IPv4 packet, and idle fields in the IPv4 packet are deleted while encapsulating the IPv4 packet into the IPv6 packet.

12. The communication terminal according to claim 9, characterized in that: when the communication terminal is a destination, the address adapter transforms a received encapsulated first IP protocol packet into the second IP protocol packet.

13. A method of sending packets by a communication terminal supporting both a first IP protocol and a second IP protocol different from the first IP protocol, the communication terminal connected to an address allocating server for dynamically allocating an address of the second IP protocol thereto, the method comprising:

acquiring a dynamically allocated address of the second IP protocol of said communication terminal from the address allocating server such that the address of the second IP protocol is temporarily acquired and then released after a specified time interval and acquiring a second IP protocol address of the destination of a second IP protocol packet from a second IP protocol application, and in said communication terminal, encapsulating the second IP protocol packet from the second IP protocol application into a first IP protocol packet, wherein the second IP protocol address of said communication terminal, included in the header of the second IP protocol packet, and the second IP protocol address of the destination are encapsulated into said first IP protocol packet, and in said communication terminal, sending said first IP protocol packet;

storing a correspondence between the first IP protocol address and the second IP protocol address in each communication terminal; transforming the first IP protocol packet into the second IP protocol packet or transforming the second IP protocol packet into the first IP protocol packet according to the correspondence stored in the address-mapping table;

wherein said first IP protocol packet is either an IPv4 packet or an IPv6 packet, said second IP protocol packet is an IPv6 packet when said first IP protocol packet is an IPv4 packet and said second IP protocol packet is an IPv4 packet when said first IP protocol packet is an IPv6 packet.

14. The method according to claim 13, characterized by:
releasing said dynamically allocated second IP protocol address, in response to a notification of the ending of said second IP protocol application.

15. The method according to claim 13, characterized in that: idle fields in the IPv6 packet are deleted while encapsulating the IPv6 packet into the IPv4 packet, and idle fields in the IPv4 packet are deleted while encapsulating the IPv4 packet into the IPv6 packet.

16. The method according to claim 13, characterized in that: when the communication terminal is a destination, a received encapsulated first IP protocol packet is transformed into the second IP protocol packet.

17. The network system according to claim 1, wherein said first protocol packet includes a flag to identify whether the first protocol packet has encapsulated the header of the second IP protocol packet.

* * * * *